(12) United States Patent
Cerra et al.

(10) Patent No.: US 11,420,828 B1
(45) Date of Patent: Aug. 23, 2022

(54) SYSTEM AND METHOD FOR ITEM SINGULATION

(71) Applicant: Amazon Technologies, Inc., Seattle, WA (US)

(72) Inventors: Andrea Cerra, Reggio Emilia (IT); Jaume Nart Baron, Vercelli (ES); Stefano La Rovere, Bereldange (LU); Cesare Stefanini, Cascina (IT); Francesco Inglese, Pontedera (IT); Michael Tannous, Pisa (IT); Gaspare Santaera, Pisa (IT); Godfried Jansen van Vuuren, Florence (IT); Marco Miraglia, Pisa (IT)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/119,182

(22) Filed: Dec. 11, 2020

(51) Int. Cl.
*B65G 47/31* (2006.01)
*B65G 15/22* (2006.01)
*B65G 43/08* (2006.01)
*G06V 20/13* (2022.01)

(52) U.S. Cl.
CPC .............. *B65G 47/31* (2013.01); *B65G 15/22* (2013.01); *B65G 43/08* (2013.01); *G06V 20/13* (2022.01)

(58) Field of Classification Search
CPC ........ B65G 47/31; B65G 15/22; B65G 43/08; G06K 9/0063

USPC ........................ 193/45, 47, 48; 198/373, 376
See application file for complete search history.

(56) References Cited

U.S. PATENT DOCUMENTS

| 4,907,686 A | * | 3/1990 | Cotic ................... | B65G 47/252 |
| | | | | 193/45 |
| 5,226,518 A | * | 7/1993 | Purcell ................. | B65G 47/256 |
| | | | | 193/44 |
| 10,647,520 B2 | * | 5/2020 | Hartmann ............ | G05B 19/418 |
| 2019/0055091 A1 | * | 2/2019 | Achterberg .......... | B65G 47/244 |

FOREIGN PATENT DOCUMENTS

| CN | 111689134 A | * | 9/2020 | .............. B65G 15/58 |
| JP | H08217254 A | * | 2/1995 | .............. B65G 21/14 |
| WO | WO-2005047141 A2 | * | 5/2005 | ........... B65G 13/075 |

* cited by examiner

*Primary Examiner* — Gene O Crawford
*Assistant Examiner* — Lester Ill Rushin
(74) *Attorney, Agent, or Firm* — Eversheds Sutherland (US) LLP

(57) ABSTRACT

Systems, methods, and computer-readable media are disclosed for systems and methods for item singulation in a conveyor belt system. The singulation system may include one or more conveyor belts, one or more piston arrays disposed below the one or more conveyor belts, one or more cameras for generating image data of the conveyor belt, and a computing device for processing the image data and controlling the piston array. The singulation system may selectively actuate pistons of the piston array to achieve singulation of the items (e.g., packages) on the conveyor belt to ensure such items are separated by a certain distance. Multiple conveyor belts in series and with increasing velocities may be employed to increase separation between items.

20 Claims, 11 Drawing Sheets

SYSTEM AND METHOD FOR ITEM SINGULATION

BACKGROUND

Conveyor belts are commonly used for distribution and manufacturing purposes. For example, systems of conveyor belts may connect a manufacturing or staging area to a freight loading area to move both large and small items placed to the freight loading area for transport. Conveyor belt systems may also be used to route items such as packages to desired locations. As the conveyor belt moves at a certain velocity, so too do the items placed upon the conveyor belt. As multiple items may be placed onto the conveyor belt at the same time or nearly the same time, the items may move along the conveyor belt in close proximity to one another at the same velocity. A change in speed of the conveyor belt will be met with an equal change in speed by the items, without any effect to the position of the items with respect to one another. It is often difficult to sort and/or route certain items on such a conveyor belt as items close in proximity to one another must be sorted and/or routed simultaneously or nearly simultaneously.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

A conveyor belt system for item singulation may include a conveyor belt, one or more sensors (e.g., cameras), one or more pistons positioned below the conveyor belt, one or more controllers to actuate the pistons, and a computing device. The conveyor belt may be used to move one or more items from a starting point of the conveyor belt to an end point of the conveyor belt. For example, one or more packages (e.g., boxes) may be placed on the conveyor belt at the starting point of the conveyor belt and may be moved to the end point of the conveyor belt. The conveyor belt may include a belt portion (e.g., that is connected at its ends to form a loop) as well as a series of rollers that may cause the belt to move continuously over the rollers. The pistons may be secured to the conveyor belt such that the pistons remain stationary as the belt moves. The conveyor belt may move at a constant velocity in a certain direction, though it is understood that the velocity may vary, increase, and/or decrease.

The pistons secured below the conveyor belt may be arranged in an array (e.g., matrix with one or more rows and/or columns). A camera may be positioned above the conveyor belt and may be pointed toward the conveyor belt such that the camera may have a field of vision defined by a perimeter that includes the piston array. The controller may be in communication with the piston array as well as the computing device. The computing device may further communicate with the camera. The images (e.g., image data) captured by the camera may be spatially calibrated by the computing device with respect to the piston array such that each piston may be associated with and correspond to a sector, cell, or section of the field of vision of the camera.

Items (e.g., packages, products, components, etc.) may be placed or otherwise introduced at the starting point of the conveyor belt and may move along the conveyor belt at a set speed (e.g., the speed of the conveyor belt). As the items move along the conveyor belt, the camera may capture an image of the conveyor belt and items in the field of vision. This image and/or image data corresponding thereto may be communicated to and processed by the computing device. If there are multiple items in the field of vision, the computing device may determine if the items are within a certain distance of one another. This distance may be the minimum distance required for singulation (e.g., the singulation distance). If the items are within the certain distance of one another, then the system may determine to actuate one or more pistons to apply a force to one or more items to alter the distance between the items (e.g., increase the distance between the items) and ultimately achieve singulation.

Figure 1:
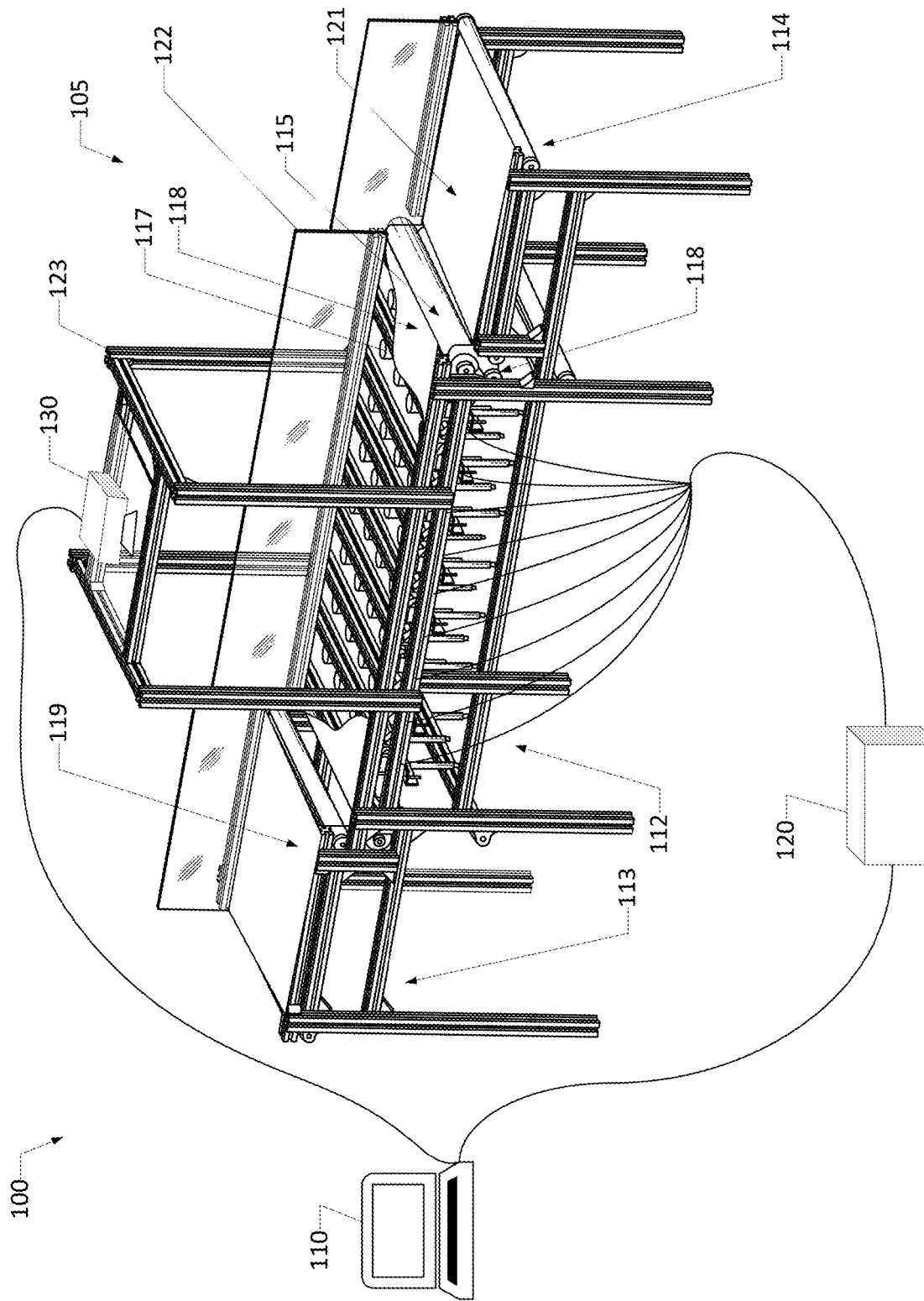
FIG. 1 is a schematic illustration of an example use case for singulation system in accordance with one or more exemplary embodiments of the disclosure.

Referring to FIG. 1, an example use case 100 including a singulation system 105 for moving items along a conveyor belt and achieving singulation between the items is depicted in accordance with one or more exemplary embodiments of the disclosure. The singulation system 105 may include conveyor system 115 and computing device 110. Conveyor system 115 may include camera 130, controller 120, piston array 112, and/or structure 123. The singulation system 105 may further include conveyor system 113 and/or conveyor system 114.

In the illustrated example, the computing device 110 may communicate with camera 130 and/or controller 120 via any well-known wired or wireless system (e.g., Bluetooth, Bluetooth Low Energy (BLE), near field communication protocol, Wi-Fi, cellular network, etc.). Additionally, the computing device 110 may communicate with a server via any well-known wired or wireless system. Computing device 110 may be any computing device with a processor and may include one or more displays (e.g., touch screen display) and/or one or more speakers. In the example illustrated in FIG. 1, computing device 110 is a laptop device comprising a processor, a display and a speaker, however it is understood that computing device may be a tablet, desktop computer, laptop computer, wearable device, or the like. Computing device 110 may run an application (e.g., local or cloud based application) to facilitate communication with one or more controllers, camera, conveyor systems and/or servers to run the singulation system and otherwise process information and/or perform operations based on data and/or information received from the camera, controllers, conveyor systems, and/or servers. The application may be one or more applications or modules run on and/or accessed by computing device 110 (e.g., one or more modules illustrated in FIG. 11, described in more detail below). It is understood that computing device 110 may be one or more computing devices. It is further understood that the software and/or computing devices of singulation system 105 may be cloud based.

Conveyor system 115 may include conveyor belt 118 and one or more rollers, wheels, and/or motors to cause conveyor belt 118 to move. Conveyor system 115 may further include piston array 112 positioned below conveyor belt 118 or below a portion of conveyor belt 118. Piston array 112 may include rows of pistons such as piston 117 which may be a pneumatic air controlled piston. It is understood that pistons in the piston array 112 may alternatively employ any other well-known actuation systems (e.g., hydraulic, electromagnetic, etc.). Pistons of piston array 112 may be secured below conveyor belt 115 using structure 123. Conveyor system 115, conveyor system 113, and/or conveyor system 114 may include one or more guide walls 122 along the periphery of conveyor belt 119, conveyor belt 118 and/or conveyor belt 121 to guide any items on conveyor belt 119, conveyor belt 118 and/or conveyor belt 121 and to prevent such items from falling off conveyor belt 119, conveyor belt 118 and/or conveyor belt 121.

Controller 120 may cause one or more pistons of piston array 112 to actuate (e.g., transition to an actuated state). It is understood that computing device 110 may communicate with controller 120 and may cause one or more pistons of piston array 120 to actuate. It is further understood that pistons of piston array 112 may be independently actuated. In one example, pistons of piston array 112 may be activated at varying speeds, forces, actuation distances, and for varying times of activation (e.g., length of time of actuation). It is understood that controller 120 may optionally be incorporated into computing device 110.

Conveyor belt 118 may have elastic properties such that a portion of conveyor belt 118 may deform when one or more pistons of piston array 112 are actuated. Conveyor belt 118 may continue to move with respect to structure 123 despite deformation in the conveyor belt 118. It is understood that computing device 110 may optionally control conveyor belt 118 and/or conveyor system 115 such that computing device 110 may select the velocity, increase the velocity, and/or decrease the velocity of conveyor belt 118. Conveyor system 119, including conveyor belt 113, and/or conveyor system 114, including conveyor belt 114, may be included in simulation system 105 and may optionally similarly be controlled by computing device 110. Structure 123 may further support conveyor system 113 and/or conveyor system 114. It is understood that conveyor system 113, conveyor system 115, and/or conveyor system 121 may be moved at different speeds from one another.

Structure 123 may further secure camera 130 above conveyor belt 118. Camera 130 may be directed towards conveyor belt 118. Camera 130 may be any well-known camera for capturing images, pictures and/or video and may have a field of vision that includes all or a portion of the conveyor belt 118. The images, pictures and/or video, or data corresponding thereto, may be communicated to computing device 130. While only one camera is shown in FIG. 1, it is understood that multiple cameras may be employed by singulation system 105. In one example, multiple cameras may be directed towards the conveyor belt 118 (e.g., with one or more piston arrays disposed below). In another example, other cameras may be directed towards conveyor belt 119 and/or conveyor belt 121. It is understood that the camera may be interchangeable with any other well-known sensor (e.g., presence sensor, photo sensor, etc.) designed to capture data corresponding to spatial and/or positional information.

Computing device 110 may process the images, pictures and/or video and/or images corresponding thereto (e.g., image data). Computing device may break up the image data into segments, portions, cells or otherwise apply a grid system to the image data. The segments may each correspond to a location along the conveyor belt 118. Computing device 110 may further know the location of each piston in the piston array and may associate each piston in the piston array with one or more segments, coordinates, cells and/or locations corresponding to the image data. In this manner, computing device 110 may know which piston or pistons correspond to locations in the image data.

Items (e.g., packages, products, boxes, components, etc.) may be placed on conveyor belt 119, conveyor belt 118 and/or conveyor belt 121 to move items from one end of singulation system 105 (e.g., starting point) to another end of singulation system 105 (e.g., end point). It is understood that conveyor belt 119, conveyor belt 118 and/or conveyor belt 121 may all be controlled to move in a common direction. As the items pass through the field of vision of camera 130, camera 130 may communicate image data of the items and conveyor belt 118 to computing device 110 which may process the image data and determine a location of the packages on the conveyor belt 118. The computing device may determine a distance between items that corresponds to the required distance between items to achieve singulation between items (e.g., singulation distance). Based on the location of items on conveyor belt 118, computing device 110 may determine a distance between the items and may determine if the distance satisfies the singulation distance (e.g., if the distance is less than the singulation distance).

If the distance is less than the singulation distance, computing device may determine which piston or pistons of the piston array 112 correspond to one or more of the items based on the location of each item, and may cause the corresponding pistons to actuate to deform the portion of the conveyor belt above the piston to apply a force to the item or items on the conveyor belt 118. The force may cause an item to move in a direction opposite of the direction of movement of the conveyor belt 118 and/or may cause the items on conveyor belt 118 to move further apart from one another. Additionally, the distance between items may further be achieved by causing conveyor belt 118 to move at a velocity higher than conveyor belt 119 and/or causing conveyor belt 121 to move at a velocity higher than conveyor belt 118. In this manner, singulation of items positioned on singulation system 105 may be achieved.

Illustrative Process and Use Cases

Figure 2:
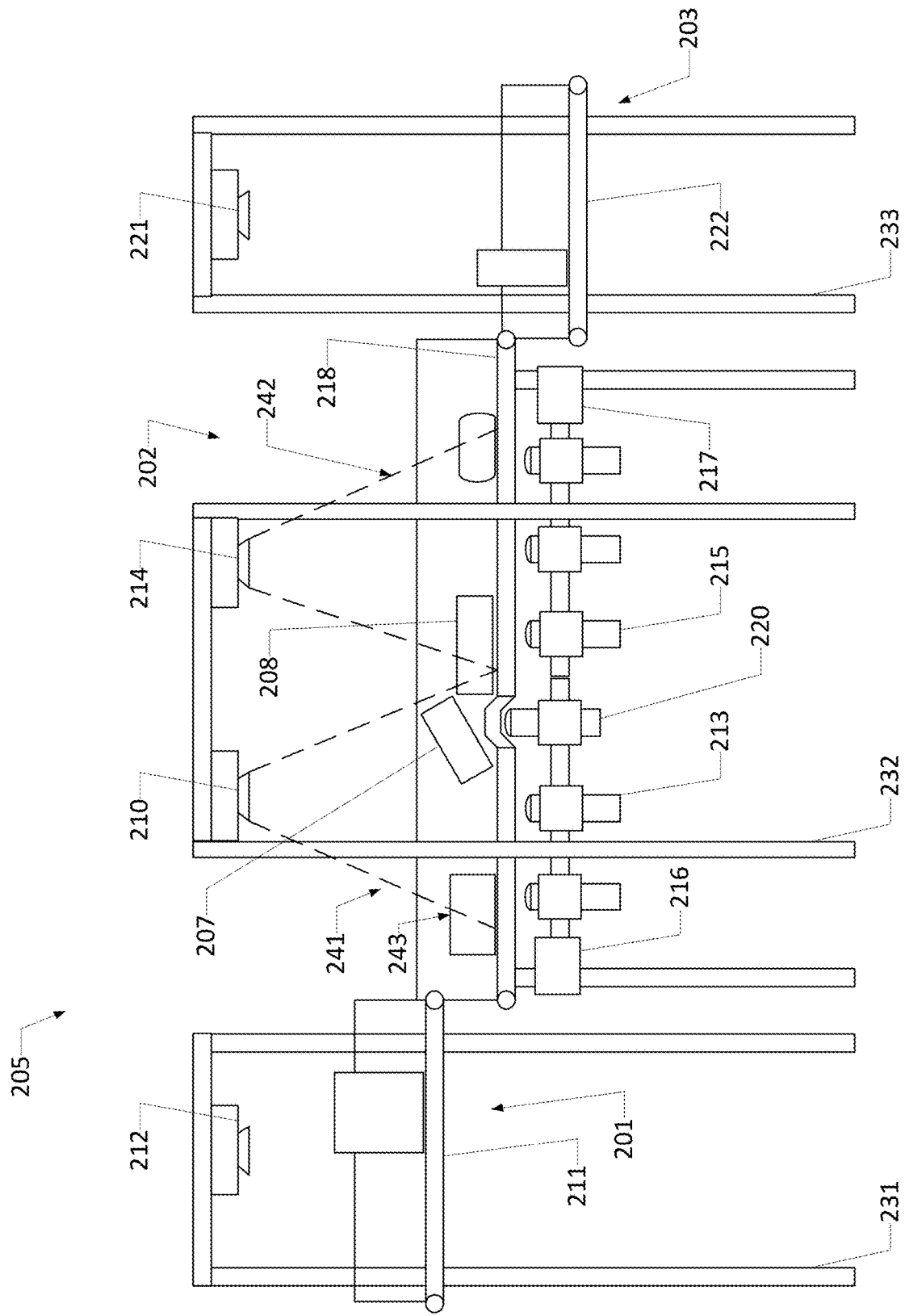
FIG. 2 is a schematic illustration of an example use case for a singulation system with two cameras and two piston arrays in accordance with one or more exemplary embodiments of the disclosure.

Referring to FIG. 2, a singulation system 205 including multiple cameras and multiple piston arrays is depicted in accordance with one or more exemplary embodiments of the disclosure. Singulation system 205 is similar to singulation system 105 and includes conveyor system 201, conveyor system 202 and conveyor system 203. Conveyor system 201 may include conveyor belt 211 and may be the same as conveyor system 113, except that conveyor system 201 may be supported by structure 231 and may include camera 212. Conveyor system 203 may include conveyor belt 222 and may be the same as conveyor system 114, except that conveyor system 203 may be supported by structure 233 and may include camera 221.

Camera 212 may be directed towards conveyor belt 211 and may have a field of vision including all or part of conveyor belt 211. Camera 221 may be directed towards conveyor belt 222 and may have a field of vision including all or part of conveyor belt 222. Camera 212 and camera 221 may capture image data and may communicate the image data to computing device 110. Computing device may process the image data from cameras 212 and 221 to determine distances between items on conveyor belt 221 and conveyor belt 222, respectively.

Conveyor system 202 may be similar to conveyor system 112 except that conveyor system 202 may include multiple piston arrays, controllers, and cameras. Specifically, piston array 213 and piston array 215 may be secured to structure 232 below conveyor belt 218. Piston array 213 may be connected to and controlled by controller 216. Piston array 215 may be connected to and controlled by controller 217. Controller 216 and controller 217 may be similar to controller 120 described above with respect to FIG. 1. Alternatively, the same controller may control multiple piston arrays. In another example, conveyor system 203 may include two or more conveyor belts (e.g., arranged in series). For example, conveyor system 202 may include two conveyor belts. The first conveyor belt may be disposed above piston array 213 and the second conveyor belt may be disposed above piston array 215. In yet another example, multiple conveyor belts may be positioned above a single piston array.

Piston array 213 and piston array 215 may be operated independently and/or simultaneously. Piston array 213 may be in the field of vision of camera 210 and piston array 215 may be in the field of vision of camera 214. As explained above with respect to camera 130 of FIG. 1, image data generated by camera 210 and camera 214 may be segmented or otherwise partitioned and pistons of piston array 213 and piston array 215 may correspond to certain segmented or partitioned areas of the image data. It is understood that the field of vision of camera 210, field of vision 241, and the field of vision of camera 214, field of vision 242, may not overlap and thus may correspond to different portions of conveyor belt 218.

As shown in FIG. 2, piston 220 of piston array 213 is actuated to deform conveyor belt 218 to apply a force to item 207. Item 207 and item 208 may be moving from left to right and may have been determined by camera 210 to have a distance there between that is less than the singulation distance. To increase the distance between item 207 and item 208, piston 220 may apply a force to item 207 to push item 207 backward (e.g., from right to left) to separate item 207 and item 208. As item 243 enters the field of vision 241, a distance between item 207 and item 243 may then be calculated and one or more pistons of piston array 213 may be actuated based on the distance between item 243 and item 207.

After items 207 and 208 leave the field of vision of camera 210, camera 214 may capture image data of item 207 and item 208 as it crosses the field of vision 242 and the computing device may process the image data. If a distance between item 207 and item 208 based on the image data captured by camera 214 does not satisfy the singulation value, one or more pistons of piston array 215 may be activated to again apply a force to item 207 and/or item 208 to separate items 207 and 208 and otherwise increase the distance between the two items.

While conveyor system 202 is illustrated with two cameras, camera 210 and camera 214, it is understood the only one camera may be used, or alternatively more than two cameras may be employed. For example, conveyor system 202 may include three cameras with three distinct fields of vision. Similarly, while two piston arrays, piston array 213 and piston array 215 are illustrated, it is understood that only one piston array or more than two piston arrays may be employed. It is further understood that each piston array may be controlled by a unique controller or alternatively, each piston array may be controlled by the same controller. While singulation system 205 include conveyor system 201 and conveyor system 203, it is understood that conveyor system 201 and conveyor system 203 are optional.

Figure 3:
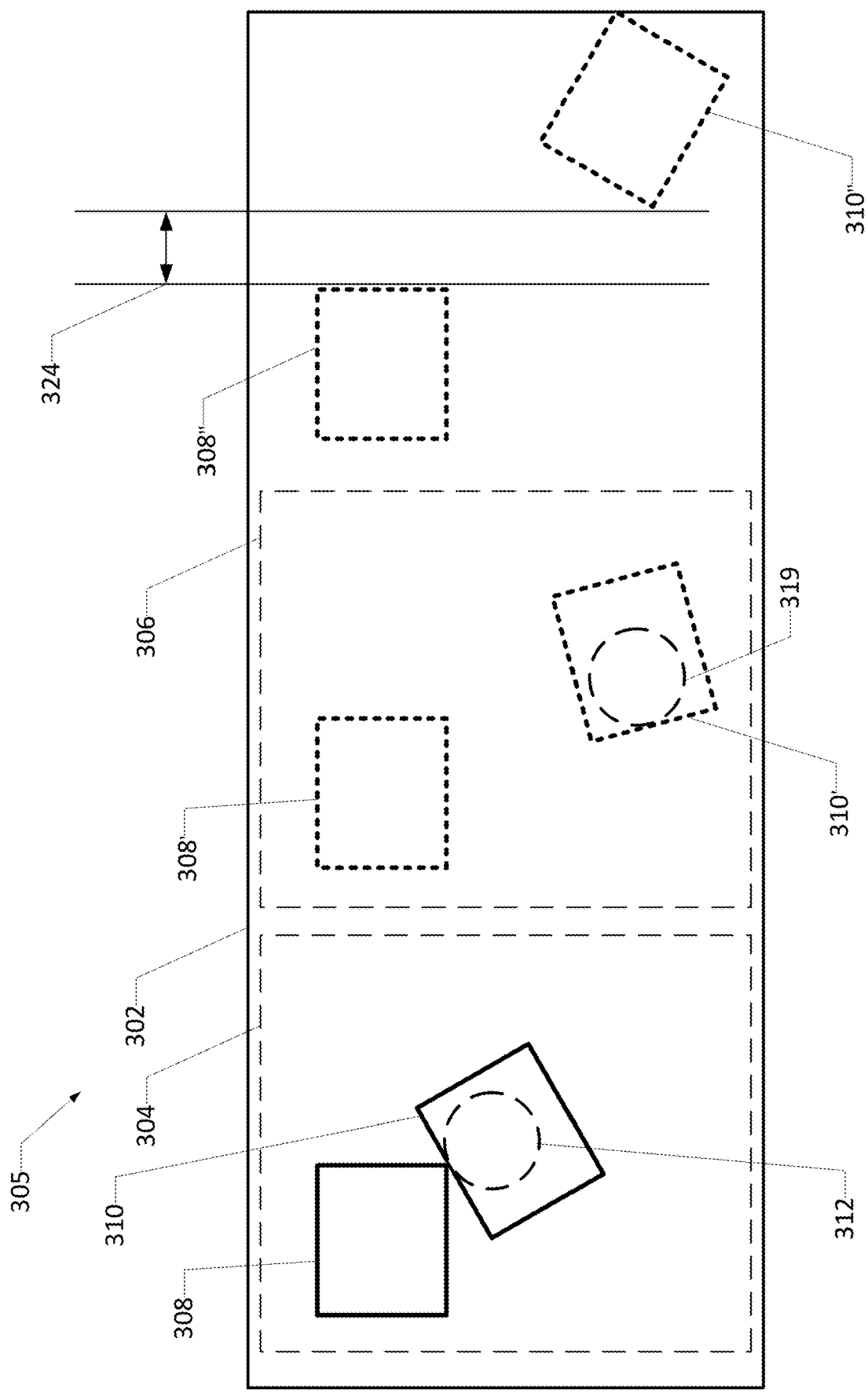
FIG. 3 is a schematic illustration of an example use case for actuating pistons in two fields of vision in accordance with one or more exemplary embodiments of the disclosure.

FIG. 3 depicts a singulation system 305 similar to singulation system 205 and including a first field of vision 304 captured by a first camera and a second field of vision 306 captured by a second camera in accordance with one or more exemplary embodiments of the disclosure. As shown in FIG. 3, the first field of vision 304 may capture a portion of conveyor belt 302 including item 308 and item 310 that are positioned on conveyor belt 302. Conveyor belt 302 may be moving at a certain velocity form left to right and thus item 308 and item 310 may be moving at the same velocity and in the same direction. A computing device in communication with the camera may analyze and/or process image data corresponding to the field of view 304 and may determine a location and/or position of item 308 and item 310 with respect to the conveyor belt 302 and a piston array arranged below conveyor belt 302, including piston 312.

Computing device 110 may be programmed such that field of vision 304 and the pistons positioned below field of vision 304 correspond to an active piston actuation scheme such that when an item is detected in the field of vision, one or more pistons corresponding to the location of the item is actuated. For example, the computing device 110 may determine that item 310 is in the field of vision 304 and may then determine piston 312 corresponds to the item 310 and may cause a controller to actuate piston 312. Under the active piston actuation scheme, the mere presence of an item in the field of vision may result in a corresponding to piston being activated. Under the active piston actuation scheme, indiscriminately applying force to items in the field of vision may incidentally result in separation of the items.

Computing device 110 may further be programmed such that field of vision 306 and the pistons positioned below field of vision 306 correspond to a smart piston actuation scheme such that a piston may only be actuated to apply a force to an item if that items fails to achieve a singulation value. After items 308 and 310 move from left to right at the velocity of the conveyor belt and enter field of vision 306, image data corresponding to items 308' and 310', previously 308 and 310 in field of vision 304, respectively, may be communicated to the computing device. Under the smart piston activation scheme, the computing device may determine a distance between item 308' and item 310' and may compare the distance to the singulation value.

As shown in FIG. 3, items 308' and 310' overlap and thus do not satisfy the singulation value. Based on the singulation value not being satisfied, the computing device 110 may determine to actuate one or more pistons corresponding to item 308' and/or 310'. For example, piston 319 may be included in the piston array below conveyor belt 302 and may be actuated based on piston 319 corresponding to image data associated with field of view 306. Piston 319 may be part of a different piston array than piston 312. By actuating piston 319, piston 319 may transition to an actuated state as it extends towards the conveyor belt 306 and may apply a force to conveyor belt 306 to deform conveyor belt 306 to transfer the force to item 310'.

The force applied to item 310' may cause item 310' to move to a different position on conveyor belt 306, thereby separating items 308' and 310'. For example, as items 308' and 310' move from left to right at the velocity of the conveyor belt and leave field of vision 306, items 308" and 310", previously 308' and 310' in field of vision 306, respectively, may be separated by distance 324. If distance 324 satisfies the singulation value (e.g., is the same or larger than the singulation value) then singulation may be achieved. In another example, both field of vision 304 and field of vision 306 may correspond to an active piston actuation scheme or a smart piston actuation scheme. It is further understood that while two segments are illustrated (e.g., field of vision 304 and field of vision 306) only one segment may be employed or alternatively more than two segments may be employed with the same piston actuation scheme or varying schemes.

Figure 4:
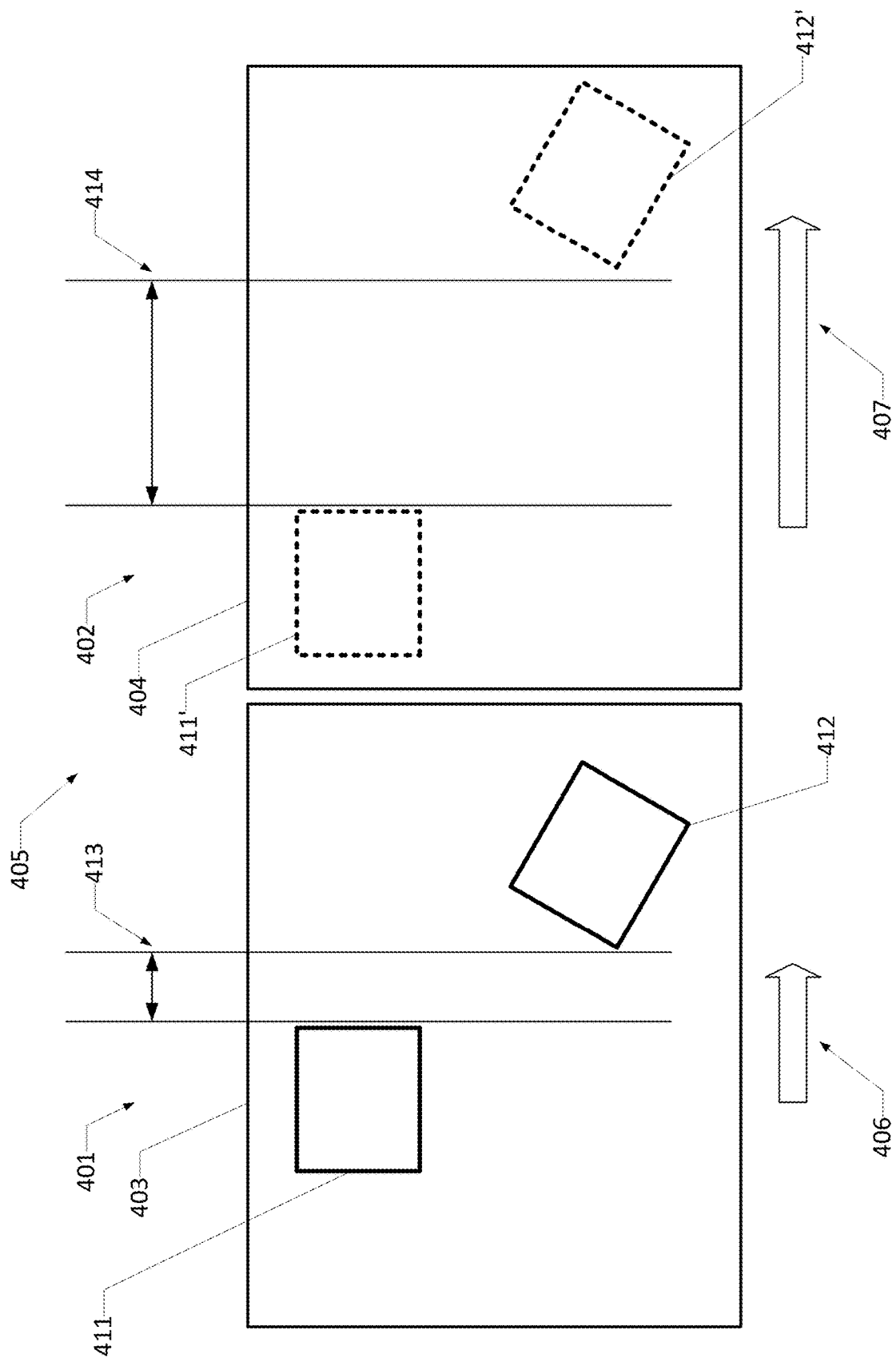
FIG. 4 is a schematic illustrations of a multi-conveyor belt system in accordance with one or more exemplary embodiments of the disclosure.

FIG. 4 depicts a singulation system 405 similar to singulation system 105 with a dual conveyor belt system operating at different velocities in accordance with one or more exemplary embodiments of the disclosure. Singulation system 405 may include conveyor system 401 and conveyor system 402. Conveyor system 401 may include conveyor belt 403 and may be similar to conveyor system 112. Conveyor system 402 may include conveyor belt 404 and may be similar to conveyor system 114. Conveyor system 401 may move from left to right at velocity 406. Similarly, conveyor system 402 may move from left to right at velocity 407. Velocity 406 may be less than velocity 407.

As shown in FIG. 4, items 411 and 412 may be positioned on conveyor belt 403 of conveyor system 401 and thus may move from left to right at velocity 406. Item 411 and item 412 may be positioned on conveyor belt 403 such that item 411 and item 412 are separated by distance 413. Conveyor system 401 may be arranged with respect to conveyor system 402 such that conveyor system 402 begins where conveyor system 401 ends. Alternatively, conveyor system 402 may be positioned at a height that is slightly offset from conveyor system 401 and conveyor system 401 may overlap with conveyor system 402, as is illustrated in FIG. 2 with respect to conveyor system 202 and conveyor system 203.

As item 411 and item 412 move from left to right along conveyor belt 403 of conveyor system 401, item 411 and item 412 will eventually reach conveyor belt 404 of conveyor system 402 and may be deposited onto conveyor belt 404. For example, item 411' and item 412' may be representations of items 411 and 412, respectively, at a time point later than that shown with respect to items 411 and 412 on conveyor belt 403. As the velocity 407 of conveyor belt 404 is higher than velocity 406 of conveyor belt 403, and considering that item 412' may be deposited onto conveyor 404 while item 411' is still on conveyor 403, the distance between item 411' and item 412' may grow while item 411' and item 412' are positioned on different conveyor belts. By the time item 411' is deposited onto conveyor belt 404, distance 413 between the items may grow to distance 414, which is larger than distance 413. In this manner the, the dual conveyor belt system of singulation system 405 may achieve singulation by operating at increasing velocities as items move down the respect conveyor belts.

Figure 5:
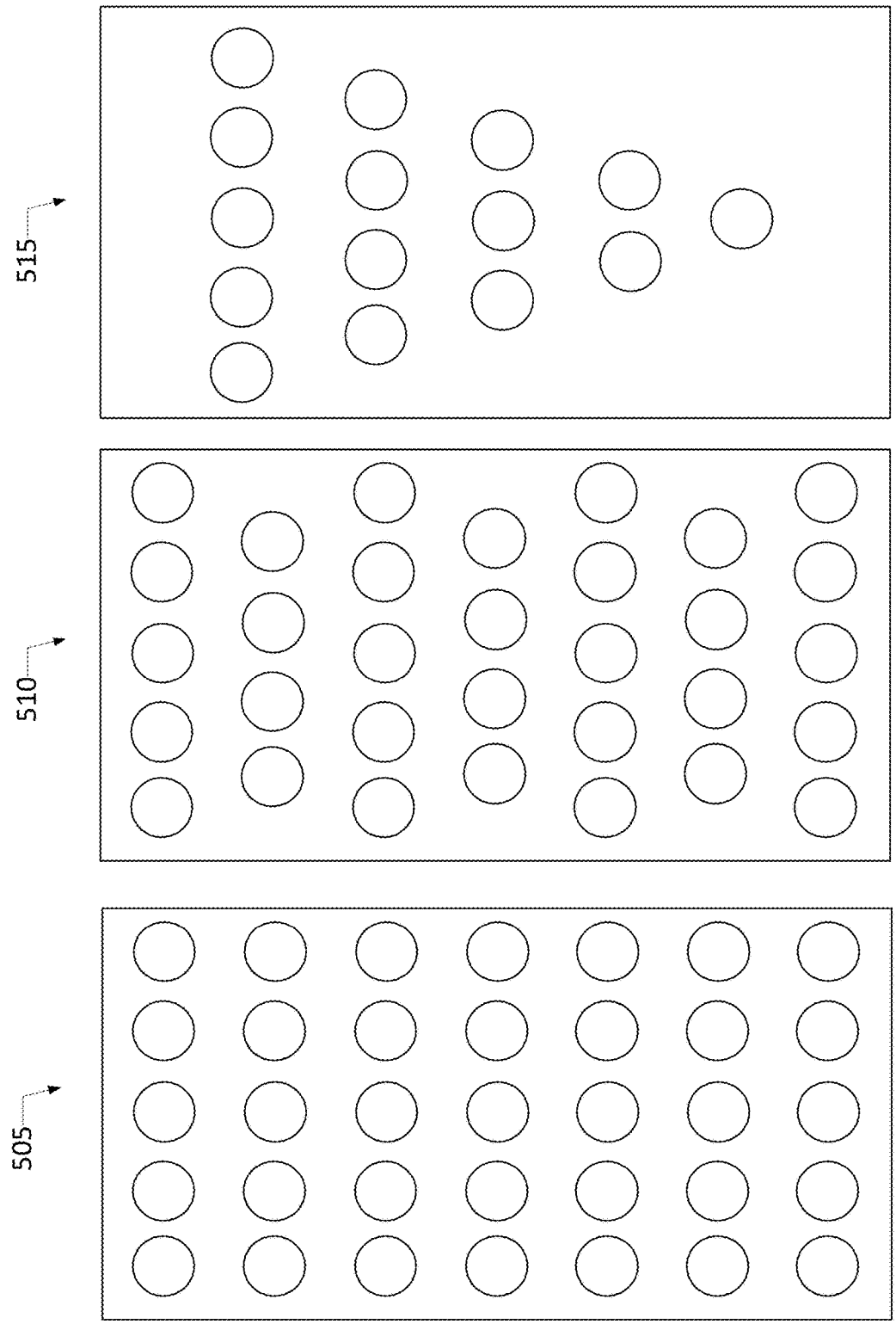
FIGS. 5A-5C are schematic illustrations of example use cases for various piston arrays in accordance with one or more exemplary embodiments of the disclosure.

FIGS. 5A-5C depict various piston array arrangements in accordance with one or more exemplary embodiments of the disclosure. FIG. 5A is an exemplary embodiment of a piston array arrangement 505 with rows and columns that are aligned. FIG. 5B is an another exemplary embodiment of a piston array arrangement 510 with rows and columns that are offset. Piston array arrangement 510 may offer more flexibility with respect to applying a force to items on the conveyor belt as the offset arrangement may reach between the uniform rows of piston array arrangement 505.

FIG. 5C is yet an another exemplary embodiment of a piston array arrangement 515 with pistons arranged in rows forming a triangular pattern. Similar to piston array arrangement 510, piston array arrangement 515 may reach between the uniform rows of piston array arrangement 505. It is understood that the rows and columns of the piston array arrangement may include greater or fewer pistons than those illustrated in FIGS. 5A-5C. It is further understood that the piston array may take any other form or shape. For example, the piston array arrangement may form a circular pattern or an arrow pattern. In one example, the diameter of the pistons and/or the distance between pistons may be determined based the items to be placed upon the conveyor belt. For example, the pistons may be positioned closer to one another if the items are expected to be small. Alternatively, the pistons may be spread apart from one another if the items are expected to be large.

Figure 6:
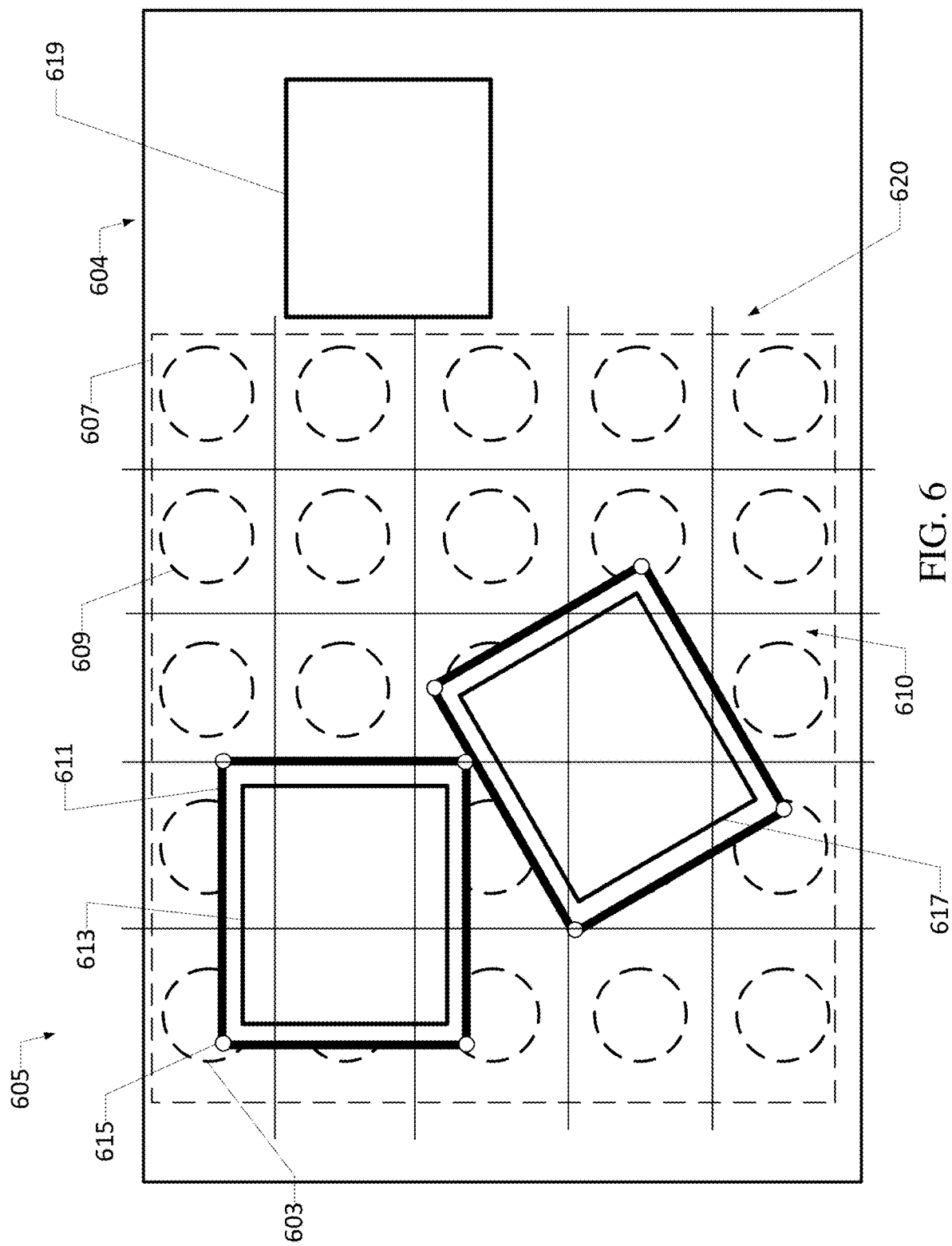
FIG. 6 is a schematic illustration of an example use case for determining item location within a field of vision in accordance with one or more exemplary embodiments of the disclosure.

FIG. 6 depicts a schematic illustration of an example use case for determining item location within a field of vision of a camera in accordance with one or more exemplary embodiments of the disclosure. As shown in FIG. 6, a camera disposed above conveyor belt 604 may have a field of vision 607 that includes a portion of the conveyor belt 604. Items placed on the conveyor belt, such as items 613 and 617 may enter the field of view of the conveyor belt. As items move on the conveyor belt (e.g., from left to right), items may exit the field of vision. For example, item 619 may not be in the field of vision.

The field of vision 607 may correspond to a piston array 609 arranged below conveyor belt 604. The piston array may not be visible in the field of vision 607. However, a computing device running the application may know the position of the piston array with respect to the field of vision. In one example, the computing device may segment the field of vision into multiple cells and each cell (e.g., cell 610) may be associated on the computing device with one or more pistons of piston array 609. Cells may be defined by a grid system (e.g., grid system 620) or another well-known segmentation technique.

The computing device, running the application, may further process image data corresponding to images captured by the camera to determine the presence and location of items in the field of vision. For example, item 613 and item 617 may be in the field of vision of the camera and may be represented in image data communicated to the computing device. Using well-known image processing techniques, the computing device may determine a perimeter for the items in the field of vision (e.g., perimeter 611) and/or may determine points of reference along the perimeter (e.g., point 615). In one example, the points of reference may correspond spatially to the segmented cells and/or grid system and based on the location of the items in the field of vision, pistons in piston array 609 that correspond to the location of the items may be determined. For example, the computing device running the application may determine that point of reference 615 is located in the same cell as piston 603. The computing device may also determine a center point of each item based on the perimeter and/or points of reference and may then determine a cell and/or piston corresponding to each center point. As the computing device may know the direction and velocity at which the conveyor belt is moving and thus at which the items are moving, the computing system may predict a location of each item at subsequent time points.

Using the perimeter, points of reference, and/or center point of each item, the computing device may determine the distance between items on the conveyor belt. For example, the distance calculated between items may be a distance between two center points of each item or between the closest reference points for each item. In another example, the distance may be the distance along a certain axis, such as a distance along the an axis that is parallel to the primary axis of the conveyor belt.

Figure 7:
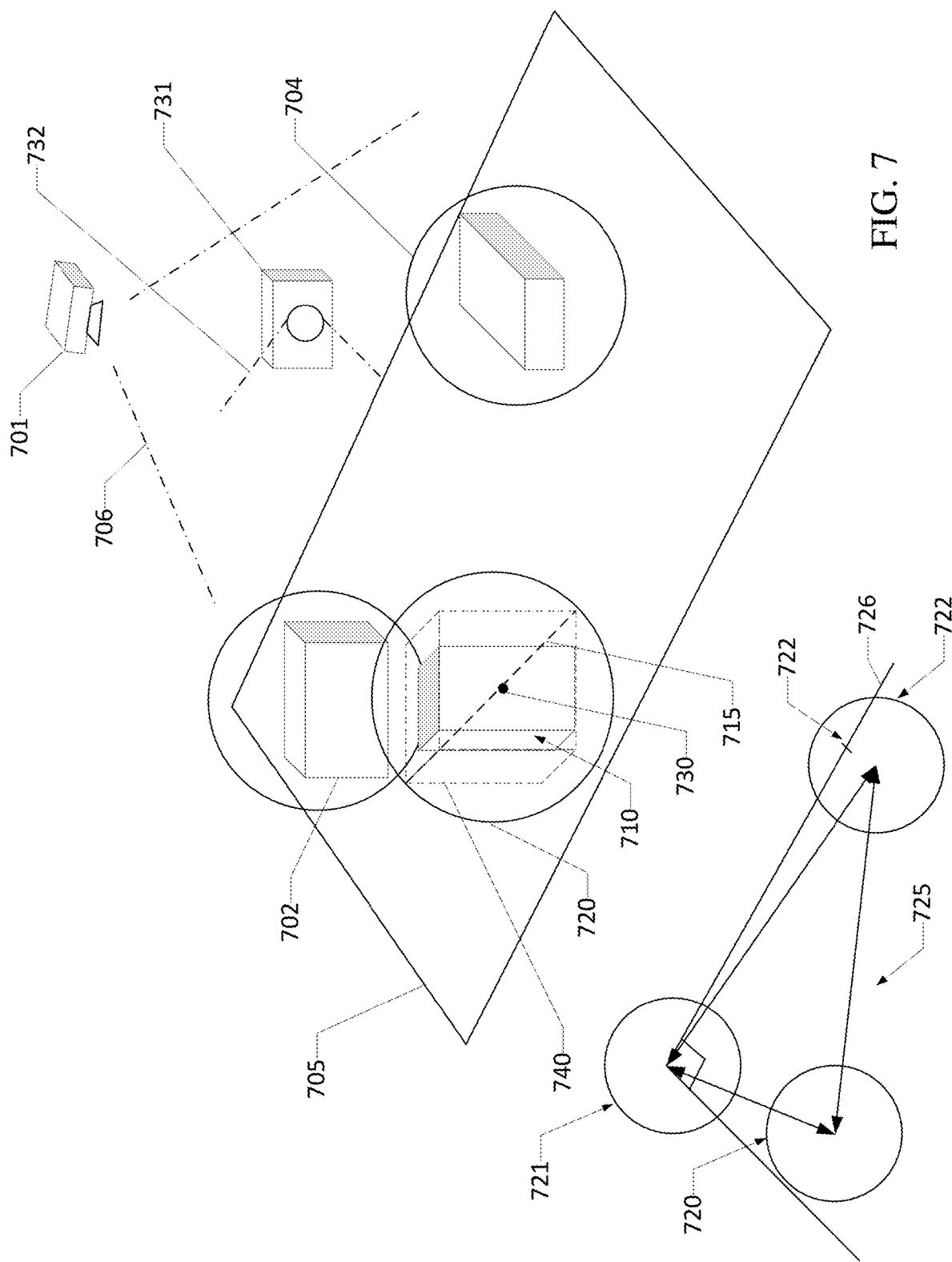
FIG. 7 is a schematic illustration of an example use case for determining item location using cuboids and spheres in accordance with one or more exemplary embodiments of the disclosure.

Referring now to FIG. 7, an exemplary technique for determining one or more distances between items positioned on a conveyor belt is depicted in accordance with one or more exemplary embodiments of the disclosure. As shown in FIG. 7, item 702, item 710, and item 704 may be positioned onto conveyor belt 705. Camera 701 may be positioned above conveyor belt 705 and may have a field of vision 706 that captures the portion of the conveyor upon which item 702, 710 and 704 are positioned. The image data generated by camera 701 may be communicated to the computing device which may be analyzed to determine distances between items in the field of vision 706 of the camera 701. It is understood that additional cameras, such as camera 731, may optionally be included in the system. For example, camera 731 may be positioned at a different angle and/or orientation than camera 701. In one example, camera 731 may be positioned such that the field of vision 732 of camera 731 is perpendicular to the field of vision 706 of camera 701. Camera 731 may communicate with the computing device in the same manner as camera 701. The image data from camera 731 may be analyzed by the computing device in the same manner as the image data from camera 701 and may be used to determine three-dimensional information about the items on the conveyor belt 705.

Upon receiving the image data, the application running on the computing device may process the image data, determine the presence of the items in the field of vision 706, determine a dimension of the items, and determine rectangular cuboids by overestimating the dimension of the items (e.g., using the largest length of the item). Upon determining the cuboids (e.g., cuboid 740) for each item in the field of vision 706 (and/or field of vision 732), each cuboid may be inscribed in a sphere of a diameter equal to the cuboid diagonal. For example length 715 may correspond to a cuboid diameter for item 710 and sphere 720 may be determined based on length 715.

Once a sphere has inscribed each cuboid, the distance between each item may be calculated. Specifically sphere 720 may correspond to item 710, sphere 721 may correspond to item 702, and sphere 722 may correspond to item 704. Direct distances 725 may be calculated by determining a straight line between each center point of each sphere. In this manner, direct distances 725 may be calculated by determining the shortest distance between each center point. Alternatively, or in addition, a distance between spheres along the primary axis of the conveyor belt (e.g., axis 726) may be calculated. For example, point 722 may correspond to the distance between sphere 722 and sphere 721 along axis 726. The distance between spheres may be used to approximate the distance between corresponding items on conveyor belt 705.

Where more than two items are positioned on the conveyor belt, a distance between each of the items may be useful for determining whether to prioritize moving one item over the others. For example, referring to FIG. 7, a computing device running the application may determine that the difference between items 702 and 704 satisfies the singulation distance but the distance between item 710 and 702 and the distance between 704 and 710 each do not satisfy the singulation distance. Based on these distance calculations, the computing device running the application may determine to prioritize item 710 over items 702 and 704 as item 710 has two distances that do not satisfy the singulation distance value. Accordingly, one or more pistons below item 710 may be actuated. It is understood that when only one camera is used, a similar approach as the one described above may be employed to determine the distance between a two-dimensional representation of the objects.

FIGS. 8A-8D are directed to exemplary embodiments for applying various forces to items on the conveyor belt. Upon determining a location of an item and corresponding pistons in the proximity of the item, the computing device running the application may vary the force applied to the item based on time and piston position with respect to a center of gravity (e.g., it may be assumed that the center of gravity is the center of the item).

Figure 8A:
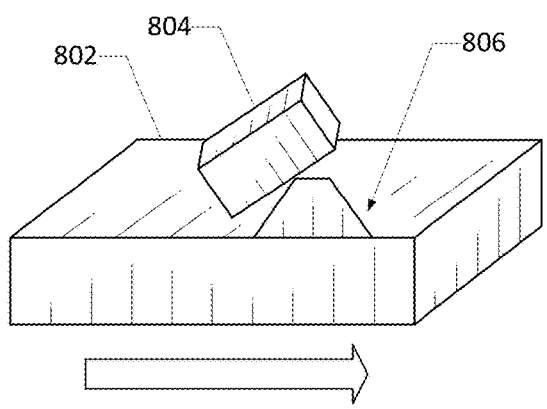
FIGS. 8A-8D are a schematic illustrations of piston actuation schemes in accordance with one or more exemplary embodiments of the disclosure.

Referring now to FIG. 8A, an item may be pushed backward with respect to the movement of the conveyor belt. As shown in FIG. 8A, conveyor belt 802 may move from left to right. To push an item 804 backward (e.g., toward the left), the computing device may cause one or more pistons to actuate prior to the center of the item traversing the piston and/or a center point of the piston. The actuation of the piston or pistons may cause a deformation 806 in the conveyor belt to apply an upward force to item 804. As the upward force is applied a distance in front of the center of the item, a moment force may occur causing the item to move to the left.

Figure 8B:
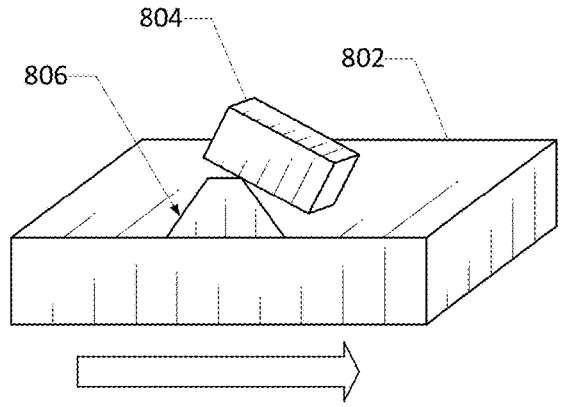

Referring now to FIG. 8B, an item may be pushed forward with respect to the movement of the conveyor belt. As shown in FIG. 8B, conveyor belt 802 may move from left to right. To push an item 804 forward (e.g., toward the right), the computing device may cause one or more pistons to actuate after the center of gravity of the item (e.g., center of the item) traverses the piston and/or a center point of the piston. The actuation of the piston or pistons may cause a deformation 806 in conveyor belt 802 to apply an upward force to item 804. As the upward force is applied a distance behind the center of the item, a moment force may occur causing the item to move to the right.

Figure 8C:
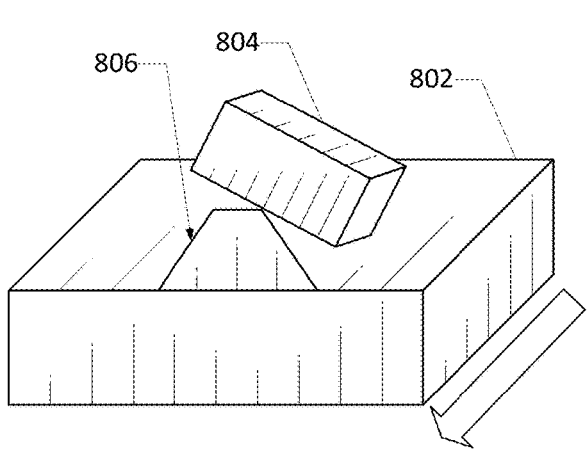

Referring now to FIG. 8C, an item may be pushed to the right side with respect to the movement of the conveyor belt. As shown in FIG. 8C, conveyor belt 802 may move from back to front. To push an item 804 to the right, the computing device may cause one or more pistons to actuate to the left of the center of gravity of the item (e.g., center of the item). The actuation of the piston or pistons may cause a deformation 806 in conveyor belt 802 to apply an upward force to item 804. As the upward force is applied a distance to the left of the center of the item, a moment force may occur causing the item to move to the right.

Figure 8D:
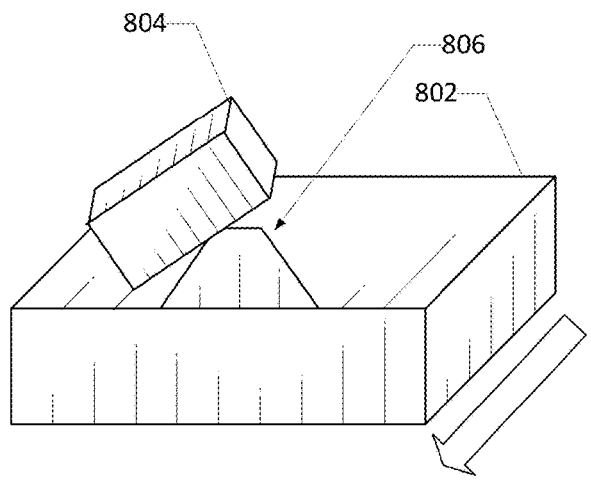

Referring now to FIG. 8D, an item may be pushed to the left side with respect to the movement of the conveyor belt. As shown in FIG. 8D, conveyor belt 802 may move from back to front. To push an item 804 to the left, the computing device may cause one or more pistons to actuate to the right of the center of the item. The actuation of the piston or pistons may cause a deformation 806 in conveyor belt 802 to apply an upward force to item 804. As the upward force is applied a distance to the right of the center of gravity of the item (e.g. center of the item), a moment force may occur causing the item to move to the left.

The image data may further be processed by the computing device running the application to predict a weight of the item based on size. Alternatively, the singulation system may include a force sensor next to or below the conveyor belt to determine or estimate the weight of an item on the conveyor belt. It is understood that the force applied to the item by the one or more pistons may vary based on the determined and/or estimated weight of the item. For example, the computing device running the application may instruct controller to apply a larger force to heavier objects. It also understood that the computing device running the application may cause the controller to vary the displacement of the piston. The displacement may be the distance traveled from a neutral position. In yet another example, the computing device running the application may cause the controller to increase or decrease the amount of time that the piston is actuated. For example, if the piston is actuated for 2 seconds, the deformation in the conveyor belt may exist for nearly the same time.

Figure 9:
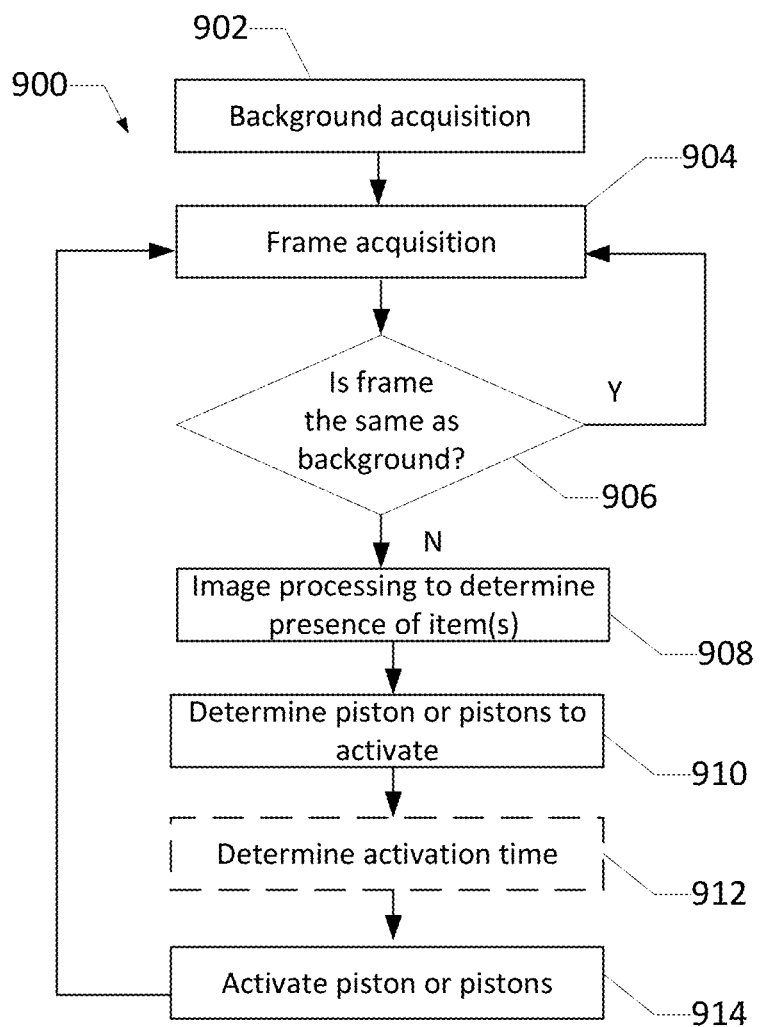
FIG. 9 is a schematic illustration of an example process flow for actuating pistons in an active piston actuation scheme in accordance with one or more exemplary embodiments of the disclosure.

FIG. 9, depicts an example process flow 900 for employing an active piston activation scheme in accordance with one or more exemplary embodiments of the disclosure. For example, the piston array in field of vision 304 of FIG. 3, described above, may employ an active piston activation scheme. In an active piston activation scheme, the mere presence of an item in a field of vision may trigger actuation of one or more pistons to cause the item to move to a different position on the conveyor belt.

To initiate the active piston activation scheme, at block 902 computer-executable instructions stored on a memory of a device, such as a computing device, may be executed to for background acquisition. For example, a camera positioned above a conveyor belt may generate images, pictures and/or video or data corresponding thereto (e.g., image data). The camera may generate background acquisition data which may be indicative of or representative of the background in the field of vision (e.g., an empty or vacant conveyor belt). The image data corresponding to the background acquisition may be saved locally on the computing device or may be saved elsewhere and accessible to the computing device.

At block 904, computer-executable instructions stored on a memory of a device, such as a computing device, may be executed to generate frame acquisition data which may be indicative of or representative of the conveyor belt at a given time. For example, frame acquisition data may correspond to image data obtained and/or generated at a time that an item is the field of view. At decision 906, computer-executable instructions stored on a memory of a device, such as a computing device, may be executed to determine whether the frame represented in the frame acquisition data is the same as the background represented in the background acquisition data. If the frame is the same as the background, the conveyor is vacant. Image data corresponding to the frame acquisition data and background acquisition data may be processed and compared to make this determination.

If the image data corresponding to the frame acquisition is the same as the image data corresponding to the background acquisition, block 904 may be reinitiated. Alternatively, if the image data corresponding to the frame acquisition is the not same as the image data corresponding to the background acquisition data, then at block 908 computer-executable instructions stored on a memory of a device, such as a computing device, may be executed to process the image data corresponding to the frame acquisition data to determine the presence and location of items on the conveyor belt. At block 910, computer-executable instructions stored on a memory of a device, such as a computing device, may be executed to determine one or more pistons that correspond to the location of the items detected based on the frame acquisition data.

At optional block 912, computer-executable instructions stored on a memory of a device, such as a computing device, may be executed to determine an activation time. For example, it may be desirable to wait a certain period of time for the item to be positioned directly over a piston as it travels along the conveyor belt. Alternatively, it may be desirable for the piston to be offset from the center of the item to cause the item to move in a particular direction. Alternatively, or additionally, a time of activation value, a force value, and/or an activation distance from a neutral position may be determined. At block 914, computer-executable instructions stored on a memory of a device, such as a computing device, may be executed to activate the one or more pistons identified at block 910 to apply a force to the item by deforming the conveyor belt.

Figure 10:
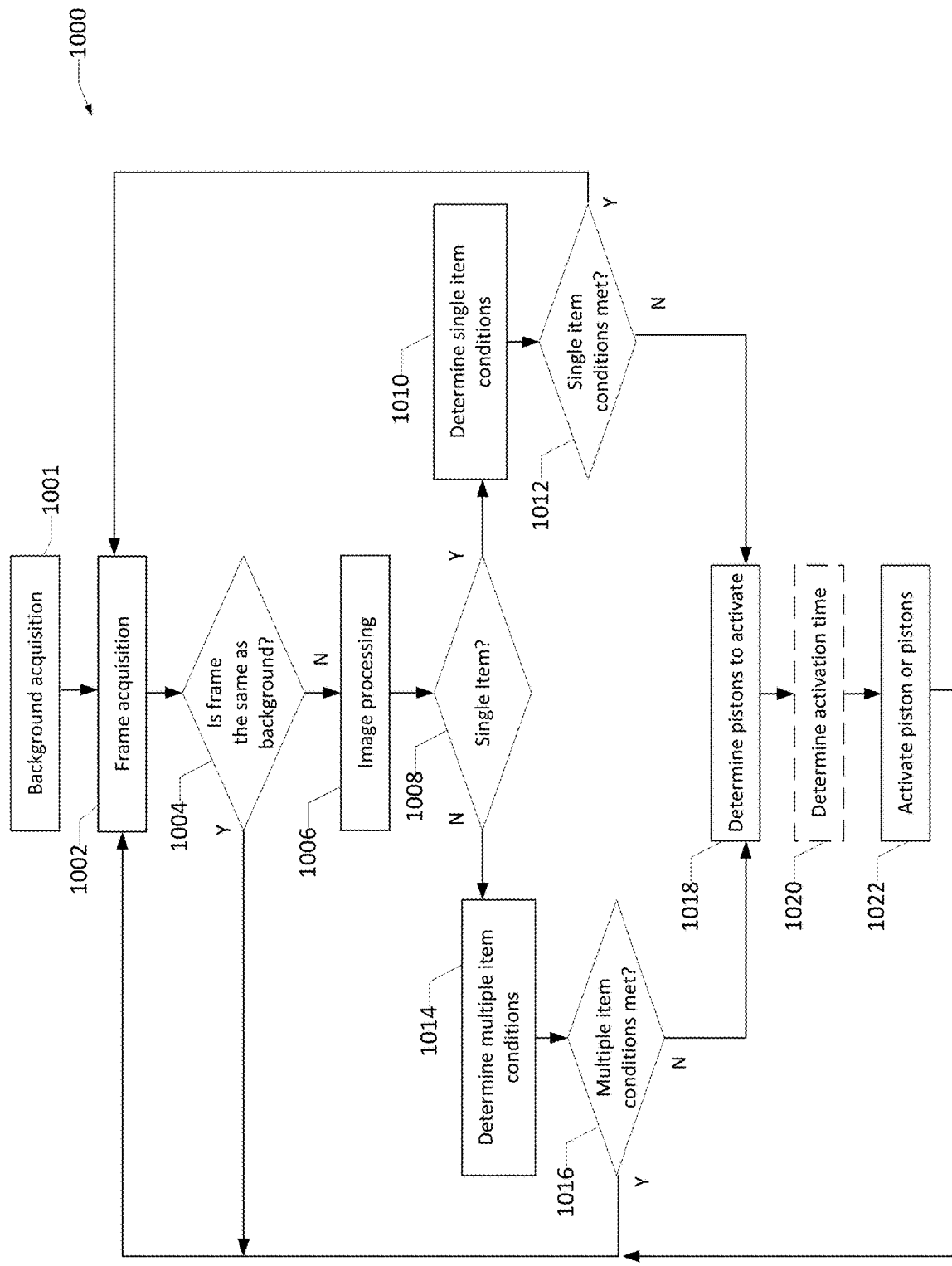
FIG. 10 is a schematic illustration of an example process flow for actuating pistons in a smart piston actuation scheme in accordance with one or more exemplary embodiments of the disclosure.

FIG. 10, depicts an example process flow 1000 for employing a smart piston activation scheme in accordance with one or more exemplary embodiments of the disclosure. For example, the piston array in field of vision 306 of FIG. 3, described above, may employ an active piston activation scheme. In an active piston activation scheme, two items that are within a certain distance of one another on the conveyor belt may trigger activation of one or more pistons to cause one or more of the items to move to a different position on the conveyor belt.

To initiate the smart piston activation scheme, at block 1001 computer-executable instructions stored on a memory of a device, such as a computing device, may be executed to determine background acquisition data. For example, a camera positioned above a conveyor belt may generate images, pictures and/or video or data corresponding thereto (e.g., image data). The camera may generate background acquisition data which may be indicative of or representative of the background in the field of vision (e.g., an empty or vacant conveyor belt). The image data corresponding to the background acquisition may be saved locally on the computing device or may be saved elsewhere and accessible to the computing device.

At block 1002, computer-executable instructions stored on a memory of a device, such as a computing device, may be executed to generate frame acquisition data which may be indicative of or representative of the conveyor belt at a given time. For example, frame acquisition data may correspond to image data obtained and/or generated at a time that an item is the field of view. At decision 1004, computer-executable instructions stored on a memory of a device, such as a computing device, may be executed to determine whether the frame represented in the frame acquisition data is the same as the background represented in the background acquisition data. Image data corresponding to the frame acquisition data and background acquisition data may be processed and compared to make this determination.

If the image data corresponding to the frame acquisition is the same as the image data corresponding to the background acquisition, block 1002 may be reinitiated. Alternatively, if the image data corresponding to the frame acquisition is the not same as the image data corresponding to the background acquisition data, then at block 1006 computer-executable instructions stored on a memory of a device, such as a computing device, may be executed to process the image data corresponding to the frame acquisition data to determine the presence and location of items on the conveyor belt.

At decision 1008, computer-executable instructions stored on a memory of a device, such as a computing device, may be executed to determine whether a single item is present. In other words, whether only a single item is present or multiple items are present. If only a single item is present, then at block 1010, computer-executable instructions stored on a memory of a device, such as a computing device, may optionally be executed to determine single item conditions. For example, a single item condition may require that the item be within a certain distance from a centerline of the conveyor belt. In another example, the single item condition may be that the item must have been adjusted with piston actuation at least once. At decision 1012, computer-executable instructions stored on a memory of a device, such as a computing device, may be executed to determine if the single item condition has been met. If the condition has been met, then block 1002 may be reinitiated. Alternatively if the single item condition has not been mater, then block 1018 may be initiated.

If instead, at decision 1008, it is determined that a single item is not present (e.g., multiple items are present on the conveyor belt), then at block 1014 computer-executable instructions stored on a memory of a device, such as a computing device, may be executed to determine multiple item conditions. For example, multiple item conditions may be the distance between items must satisfy a threshold singulation value. In one example, even if only a portion of the two items is detected, then the system will determine that a single item is not present. At decision 1016, computer-executable instructions stored on a memory of a device, such as a computing device, may be executed to determine if the multiple item condition has been met. This determination may be made, for example, by determining the distance between items and comparing the distance to the singulation distance, as explained herein. If the condition has been met, then block 1002 may be reinitiated. Alternatively if the single item condition has not been mater, then block 1018 may be initiated.

At block 1018, computer-executable instructions stored on a memory of a device, such as a computing device, may be executed to determine one or more pistons to activate based on the unmet conditions at block 1010 and/or block 1014. This determination may be based on the location of one or more items on the conveyor belt. At optional block 1020, computer-executable instructions stored on a memory of a device, such as a computing device, may be executed to determine an activation time. For example, it may be desirable to wait a certain period of time for the item to be positioned directly over a piston as it travels along the conveyor belt. Alternatively, it may be desirable for the piston to be offset from the center of the item to cause the item to move in a particular direction. Alternatively, or additionally, a time of activation value, a force value, and/or an activation distance from a neutral position may be determined. At block 1022, computer-executable instructions stored on a memory of a device, such as a computing device, may be executed to activate the one or more pistons identified at block 1018 to apply a force to the one or more items by deforming the conveyor belt. In one example, one or more pistons may be actuated to increase a distance between multiple items on the conveyor belt. In another example, one or more pistons may be actuated to move an item closer to a centerline.

Illustrative Device Architecture

Figure 11:
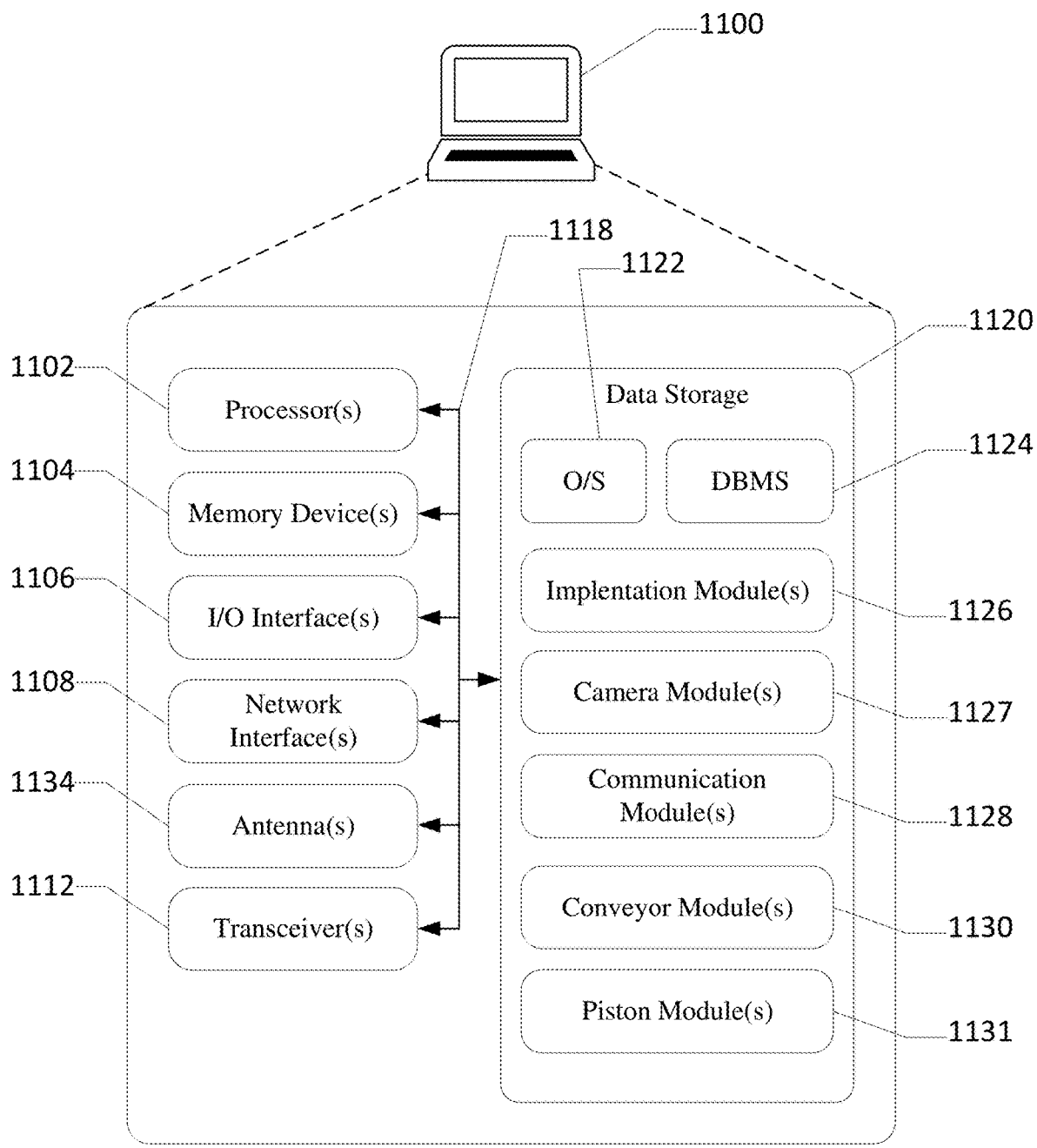
FIG. 11 is a schematic block diagram of a computing device in accordance with one or more exemplary embodiments of the disclosure.

FIG. 11 is a schematic block diagram of an illustrative computing device 1100 in accordance with one or more exemplary embodiments of the disclosure. The computing device 1100 may be any suitable computing device capable of receiving and/or sending data, and may optionally be coupled to devices including, but not limited to, cameras, controllers, conveyor belt controllers, computing devices and/or one or more servers, or the like. The computing device 1100 may correspond to computing device 110 and any other computing device of FIGS. 1-10.

The computing device 1100 may be configured to communicate via one or more networks with one or more servers, camera, controllers, electronic devices, user devices, wearable devices, smart sensors, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1100 may include one or more processors (processor(s)) 1102, one or more memory devices 1104 (generically referred to herein as memory 1104), one or more input/output (I/O) interface(s) 1106, one or more network interface(s) 1108, one or more optional sensors or sensor interface(s) 1110, one or more transceivers 1112, one or more optional speakers, one or more optional microphones, one or more antenna(s) 1134, and power source 1117 which may be a power source such as a battery (e.g., rechargeable battery). The computing device 1100 may further include one or more buses 1118 that functionally couple various components of the computing device 1100. The computing device 1100 may further include one or more antenna(e) 1134 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1118 may include at least one of a system bus, a memory bus, an address bus, or a message bus, and may permit exchange of information (e.g., data (including computer-executable code), signaling, etc.) between various components of the computing device 1100. The bus(es) 1118 may include, without limitation, a memory bus or a memory controller, a peripheral bus, an accelerated graphics port, and so forth. The bus(es) 1118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1104 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1104 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1120 may include removable storage and/or non-removable storage including, but not limited to, magnetic storage, optical disk storage, and/or tape storage. The data storage 1120 may provide non-volatile storage of computer-executable instructions and other data. The memory 1104 and the data storage 1120, removable and/or non-removable, are examples of computer-readable storage media (CRSM) as that term is used herein.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to memory 1104 for use by the processor(s) 1102 during the execution of the computer-executable instructions. Moreover, output data generated as a result of execution of the computer-executable instructions by the processor(s) 1102 may be stored initially in memory 1104, and may ultimately be copied to data storage 1120 for non-volatile storage.

More specifically, the data storage 1120 may store one or more operating systems (O/S) 1122; one or more optional database management systems (DBMS) 1124; and one or more implementation module(s) 1126, one or more camera module(s) 1127, one or more communication module(s) 1128, one or more conveyor module(s) 1130 and/or one or more piston module(s) 1131. Some or all of these module(s) may be sub-module(s). Any of the components depicted as being stored in data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in data storage 1120 may support functionality described in reference to correspondingly named components earlier in this disclosure.

The data storage 1120 may further store various types of data utilized by components of the computing device 1100. Any data stored in the data storage 1120 may be loaded into the memory 1104 for use by the processor(s) 1102 in executing computer-executable code. In addition, any data depicted as being stored in the data storage 1120 may potentially be stored in one or more datastore(s) and may be accessed via the DBMS 1124 and loaded in the memory 1104 for use by the processor(s) 1102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 11, the datastore(s) may include, for example, user preference information, user contact data, device pairing information, and other information.

The processor(s) 1102 may be configured to access the memory 1104 and execute computer-executable instructions loaded therein. For example, the processor(s) 1102 may be configured to execute computer-executable instructions of the various program module(s), applications, engines, or the like of the computing device 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1102 may be capable of supporting any of a variety of instruction sets.

Referring now to functionality supported by the various program module(s) depicted in FIG. 11, the implementation module(s) 1126 may include computer-executable instructions, code, or the like that responsive to execution by one or more of the processor(s) 1102 may perform functions including, but not limited to, overseeing coordination and interaction between one or more modules and computer executable instructions in data storage 1120, determining user selected actions and tasks, determining actions associated with user interactions, determining actions associated with user input, sending and receiving signals and/or data to and from one or more cameras, controllers, other computing devices, servers, datastores and the like, initiating commands locally or at remote computing devices, and the like.

Camera module 1127 may include computer-executable instructions, code, or the like that responsive to execution by one or more of the processor(s) 1102 may perform functions including, but not limited to, communicating with one or more cameras, analyzing and/or processing image data, determining positional and spatial information based on the image data, determining and/or predicting item location based on image data, comparing image data and otherwise controlling one or more camera.

The communication module(s) 1128 may include computer-executable instructions, code, or the like that responsive to execution by one or more of the processor(s) 1102 may perform functions including, but not limited to, communicating with one or more cameras, controllers, conveyor belts, conveyor systems, sensors, devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The conveyor module(s) 1130 may include computer-executable instructions, code, or the like that responsive to execution by one or more of the processor(s) 1102 may perform functions including, but not limited to, communicating with one or more conveyor belts and/or conveyor systems to control the conveyor belt and/or determine information about the conveyor belt and/or conveyor system. For example, the conveyor module may control the on/off functionality and speed of one or more conveyor belts and/or conveyor systems. Additionally, conveyor module 1130 may determine the speed of one or more conveyor belts.

The piston module(s) 1131 may include computer-executable instructions, code, or the like that responsive to execution by one or more of the processor(s) 1102 may perform functions including, but not limited to, communicating with one or more controllers and controlling actuating of pistons in one or more piston arrays. For example, piston module may control piston actuation, force, time, distance of extension, and/or speed. The piston module may further maintain spatial information with respect to one or more pistons in one or more piston arrays.

Referring now to other illustrative components depicted as being stored in the data storage 1120, the O/S 1122 may be loaded from the data storage 1120 into the memory 1104 and may provide an interface between other application software executing on the computing device 1100 and hardware resources of the computing device 1100. More specifically, the O/S 1122 may include a set of computer-executable instructions for managing hardware resources of the computing device 1100 and for providing common services to other application programs (e.g., managing memory allocation among various application programs). In certain example embodiments, the O/S 1122 may control execution of the other program module(s) to for content rendering. The O/S 1122 may include any operating system now known or which may be developed in the future including, but not limited to, any server operating system, any mainframe operating system, or any other proprietary or non-proprietary operating system.

The optional DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (e.g., relational model, object model, etc.) and may support any of a variety of query languages. The DBMS 1124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 1100 is a mobile electronic device, the DBMS 1124 may be any suitable light-weight DBMS optimized for performance on a mobile device.

Referring now to other illustrative components of the computing device 1100, the optional input/output (I/O) interface(s) 1106 may facilitate the receipt of input information by the computing device 1100 from one or more I/O devices as well as the output of information from the computing device 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1100 or may be separate. The I/O devices may further include, for example, any number of peripheral devices such as data storage devices, printing devices, and so forth.

The I/O interface(s) 1106 may also include an interface for an external peripheral device connection such as universal serial bus (USB), FireWire, Thunderbolt, Ethernet port or other connection protocol that may connect to one or more networks. The I/O interface(s) 1106 may also include a connection to one or more of the antenna(e) 1134 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1100 may further include one or more network interface(s) 1108 via which the computing device 1100 may communicate with any of a variety of other systems, platforms, networks, devices, and so forth. The network interface(s) 1108 may enable communication, for example, with one or more wireless routers, one or more host servers, one or more web servers, and the like via one or more of networks.

The antenna(e) 1134 may include any suitable type of antenna depending, for example, on the communications protocols used to transmit or receive signals via the antenna(e) 1134. Non-limiting examples of suitable antennas may include directional antennas, non-directional antennas, dipole antennas, folded dipole antennas, patch antennas, multiple-input multiple-output (MIMO) antennas, or the like. The antenna(e) 1134 may be communicatively coupled to one or more transceivers 1112 or radio components to which or from which signals may be transmitted or received.

As previously described, the antenna(e) 1134 may include a Bluetooth antenna configured to transmit or receive signals in accordance with established standards and protocols, such as Bluetooth and/or BLE. Alternatively, or in addition to, antenna(e) 1134 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 1134 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1134 may be configured to transmit or receive radio frequency signals within any suitable frequency range forming part of the unlicensed portion of the radio spectrum (e.g., 900 MHz).

The antenna(e) 1134 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1112 may include any suitable radio component(s) for—in cooperation with the antenna(e) 1134—transmitting or receiving radio frequency (RF) signals in the bandwidth and/or channels corresponding to the communications protocols utilized by the computing device 1100 to communicate with other devices. The transceiver(s) 1112 may include hardware, software, and/or firmware for modulating, transmitting, or receiving—potentially in cooperation with any of antenna(e) 1134—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1112 may further include hardware, firmware, or software for receiving GNSS signals. The transceiver(s) 1112 may include any known receiver and baseband suitable for communicating via the communications protocols utilized by the computing device 1100. The transceiver(s) 1112 may further include a low noise amplifier (LNA), additional signal amplifiers, an analog-to-digital (A/D) converter, one or more buffers, a digital baseband, or the like.

The optional sensor(s)/sensor interface(s) 1110 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1110 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1100 and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the computing device 1100 may include alternate and/or additional hardware, software, or firmware components beyond those described or depicted without departing from the scope of the disclosure. More particularly, it should be appreciated that software, firmware, or hardware components depicted as forming part of the computing device 1100 are merely illustrative and that some components may not be present or additional components may be provided in various embodiments. While various illustrative program module(s) have been depicted and described as software module(s) stored in data storage 1120 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A method comprising:
   determining a first image indicative of a first package and a second package disposed on a conveyor belt;
   determining a first position of the first package based on the first image;
   determining a second position of the second package based on the first image;
   determining a first distance between the first package and the second package based on the first position and the second position;
   determining a threshold distance indicative of singulation;
   determining that the first distance is less than the threshold distance;
   determining a first piston having a third position, the first piston disposed below the conveyor belt;
   determining the third position of the first piston is within a second distance of the first position of the first package;
   causing the first piston to actuate to apply a first force to the first package; and
   determining a fourth position of the first package and a fifth position of the second package after causing the first piston to actuate; and
   determining a third distance based on the fourth position and the fifth position.

2. The method of claim 1, further comprising:
   determining the third distance is less than the threshold distance;
   determining a second piston corresponding to the fourth position of the first package; and
   causing the second piston to actuate to apply a second force to the first package based on the third distance being less than the threshold distance.

3. The method of claim 1, wherein the first position corresponds to a first time value, and further comprising:
   determining a fourth distance between the first package and the first piston at a second time value later than the first time value; and
   causing the first piston to actuate to apply the first force to the first package at the second time value.

4. The method of claim 3, wherein the first package is moving at a first velocity of the conveyor belt in a first direction and actuation of the first piston at the second time value causes the first package to move in a second direction opposite of the first direction.

5. A system comprising:
   a first conveyor surface configured to move in a first direction;
   a camera configured to image the first conveyor surface;
   a first piston disposed below the first conveyor surface and configured to move between a default position and an extended position, wherein the first piston causes the first conveyor surface to deform in the extended position; and
   a computing device configured to:
      determine a first image using the camera;
      determine, using the first image, a first distance between a first item and a second item on the first conveyor surface; and
      cause the first piston to actuate, such that a force is applied to the first item to cause the first item to move in a second direction from a first location on the first conveyor surface to a second location on the first conveyor surface different from the first location.

6. The system of claim 5, wherein the computing device is further configured to:
   determine a default location of the first piston;
   determine the first location of the first item; and
   determine the default location corresponds to the first location based on a second distance between the default location and the first location.

7. The system of claim 5, wherein:
   the first piston is a pneumatic air controlled piston; and
   the first piston is configured to deform the first conveyor surface when actuated to apply the force to the first item.

8. The system of claim 5, wherein the first conveyor surface is configured to move at a first velocity in the first direction, and further comprising:
   a second conveyor surface aligned with the first conveyor surface, the second conveyor surface configured to move at a second velocity in the first direction.

9. The system of claim 8, wherein:
   the second conveyor surface is disposed at an end of the first conveyor surface, and
   the second velocity is higher than the first velocity.

10. The system of claim 5, wherein the first piston is within a first field of vision of the first camera, and further comprising:
    a second camera disposed above the first conveyor surface and configured to capture images of the first conveyor surface; and
    a second piston disposed below the first conveyor surface and configured to move between a second default position and a second extended position, wherein the second piston causes the first conveyor surface to deform in the second extended position and the second piston is in a second field of vision of the second camera.

11. The system of claim 10, wherein the computing device is further configured to:
    determine a first segment of the first conveyor surface based on the first image of the first camera, the first segment corresponding to the first piston; and
    determine a second segment of the first conveyor surface based on a second image from the second camera, the second segment corresponding to the second piston.

12. The system of claim 10, further comprising:
    a first controller configured to actuate the first piston based on the first image of the first camera, and further comprising:
    a second controller configured to actuate the second piston, independent of the first piston, based on a second image from the second camera.

13. The system of claim 5, wherein the first item is moving at a first velocity in the first direction, and wherein the computing device is further configured to:
    determine a first time value corresponding to the first location of the first item and a third location corresponding to the first item; and determine to actuate the piston at a second time value after the first time value to cause the first item to move in the second direction opposite the first direction.

14. The system of claim 5, wherein the computing device is further configured to:

determine a size of the first item;

determine an estimated center gravity of the first item; and determine a force value to apply to the estimated center of gravity of the first item based on the size of the first item.

15. The system of claim 5, further comprising:

an array of pistons, the array of pistons disposed below the first conveyor surface and including the first piston, wherein the array of pistons includes a first row of pistons and a second row of pistons offset from the first row of pistons.

16. A method comprising:

determining a first image indicative of a first item and a second item disposed on a conveyor surface moving at a first velocity in a first direction;

determining, based on the first image, a first position of the first item and a second position of the second item;

determining a first distance between the first position and the second position;

determining the first distance is less than a first value indicative of singulation;

determining a first piston corresponding to the first position and disposed below the conveyor surface; and causing the first piston to actuate to apply a force to the first item.

17. The method of claim 16, further comprising;

determining a third position of the first piston;

determining a second distance between the third position and the first position;

determining to cause the first piston to actuate based on the second distance being less than a second value.

18. The method of claim 16, further comprising;

determining a third position of the first item after causing the first piston to actuate;

determining a fourth position of the second item after causing the first piston to actuate;

determining a second distance between the third position and the fourth position; and determining the second distance satisfies the first value.

19. The method of claim 16, wherein the first position corresponds to the first item at a first time value and the first piston is caused to actuate at a second time value to cause the first item to move in a second direction opposite of the first direction.

20. The method of claim 16, further comprising:

determining a first cuboid shape to approximate the first item;

determining a second cuboid shape to approximate the second item;

determining a first sphere to approximate and inscribe the first cuboid;

determining a second sphere to approximate and inscribe the second cuboid; and determining the first distance by determining a distance between a first center point of the first sphere and a second point of the second sphere.

* * * * *